Patented Apr. 14, 1925.

1,533,932

UNITED STATES PATENT OFFICE.

ERNEST JOSEPH LUSH, OF LONDON, ENGLAND, ASSIGNOR TO TECHNICAL RESEARCH WORKS LIMITED, OF LONDON, ENGLAND.

PROCESS FOR THE PREPARATION AND REACTIVATION OF METALLIC CATALYSTS USED IN THE HYDROGENATION OF OILS AND LIKE SUBSTANCES.

No Drawing.     Application filed March 10, 1924. Serial No. 698,287.

*To all whom it may concern:*

Be it known that I, ERNEST JOSEPH LUSH, subject of the King of Great Britain, and a resident of London, England, have invented a certain new and improved process for the preparation and reactivation of metallic catalysts used in the hydrogenation of oils and like substances, of which the following is a specification.

In the hydrogenation of oils and other organic substances either liquid or gaseous or such as can be vaporized it has been proposed to pass the substance to be hydrogenated through a vessel charged with the activated catalytic mass as described in the specification of my pending application for U. S. Patent Serial No. 655728 and when the surfaces of the catalyst become inactive through continuous use the catalytic mass has to be treated as for example by solvents to extract oil and after treatment removed from the said vessel to be reactivated in an electrolytic bath.

Now the object of the present improved process is to enable such reactivation of the catalytic mass to be effected without disturbing the same. According to this invention the metallic surfaces of for example nickel turnings either fresh or those that have become inactive through use and have been freed from oil or other organic material by extraction with a solvent or other means according to the nature of the organic material are submitted to the action of powerful oxidizing agents for example by submerging the catalytic mass in a solution of hypochlorous acid prepared electrolytically or by the action of acid on bleaching powder, or in an alkaline solution of bleaching powder or hypochlorite whereby an oxidized surface is formed on the metal which is subsequently washed by water being passed through the mass and then reduced in hydrogen from 250° C. to 350° C. such treatment resulting in the production of an active catalyst through which the organic substance to be hydrogenated, for example oil, may be caused to flow as long as the surface remains active.

It will be clear that this cycle of operations results in the preparation and reactivation of catalytic surfaces in the one vessel through which the substance to be treated afterwards flows and may be repeated indefinitely.

It is to be understood that oxidizing agents other than hypochlorous acid and its salts may be used provided that these reagents cause surface oxidation at low temperatures of the metallic surface which conditions I have found necessary for the production by subsequent reduction of active catalysts.

To prevent discoloration of the hydrogenated product such as would result from the use of an iron vessel where liquids and not vapours or gases are hydrogenated when reactivation takes place in situ—which possibility is an advantage but not an essential condition for the production of a catalyst by this means—a nickel or copper vessel may be used or a vessel lined with either of these metals or alternatively a glass or enamel-lined vessel may be used or such other material as will either resist the action of the oxidizing agent or be subsequently reduced at the same time as the catalytic mass.

Moreover, the catalytic mass may be contained in a vessel which fits into the hydrogenation vessel so that reactivation and, if desirable, reduction to an active catalyst may take place outside the hydrogenation vessel.

It is to be understood that this invention is applicable to the activation and reactivation of any metallic surface whether this be in the form of turnings or metallic powder, which latter may be deposited on material inert to the action of the oxidizing agent such as kieselguhr.

What I claim is—

1. A process for the preparation and reactivation of metallic catalysts used in the hydrogenation of oils and like substances which consists in treating the catalytic mass with a compound containing hypochlorite ions for the oxidation of said mass which is afterwards washed and reduced in hydrogen to activate same.

2. A process for the preparation and reactivation of metallic catalysts used in the hydrogenation of oils and like substances which consists in treating the catalytic mass with a compound containing hypochlorite acid ions for the oxidation of said mass which is afterwards washed and reduced in hydrogen to activate same.

3. In the process of hydrogenation of oils and like substances wherein the material to be hydrogenated is passed through a vessel charged with an activated catalytic metallic mass subjecting said mass, when its activity is impaired through use and after removal of the residue of the hydrogenated product, to the action of a compound containing hypochlorite ions for the oxidation of the metallic surfaces which are afterwards washed and reduced in hydrogen for the purpose of reactivating same.

4. In the process of hydrogenation of oils and like substances wherein the material to be hydrogenated is passed through a vessel charged with an activated catalytic metallic mass subjecting said mass, when its activity is impaired through use and after removal of the residue of the hydrogenated product, to the action of a compound containing hypochlorite acid ions for the oxidation of the metallic surfaces which are afterwards washed and reduced in hydrogen for the purpose of reactivating same.

In testimony whereof I affix my signature.

ERNEST JOSEPH LUSH.